United States Patent [19]

Edwards et al.

[11] 4,188,362
[45] Feb. 12, 1980

[54] PROCESS FOR THE TREATMENT OF PLATINUM GROUP METALS AND GOLD

[75] Inventors: Roderick I. Edwards, Honeydew; Joe P. Loo, Sandton; David I. Ossin, Johannesburg, all of South Africa

[73] Assignee: National Institute for Metallurgy, Randburg, South Africa

[21] Appl. No.: 919,837

[22] Filed: Jun. 28, 1978

Related U.S. Application Data

[63] Continuation-in-part of Ser. No. 825,151, Aug. 16, 1977, abandoned, which is a continuation of Ser. No. 652,283, Jan. 26, 1976, abandoned.

[30] Foreign Application Priority Data

Jan. 29, 1975 [ZA] South Africa ............ 75/0593

[51] Int. Cl.$^2$ ............................................. C01G 55/00
[52] U.S. Cl. ............................................. 423/22; 75/109; 75/121; 75/111; 75/112; 75/27; 423/38; 423/40; 423/41; 423/150

[58] Field of Search ............ 75/11, 12, 27, 97, 111, 75/112, 109, 121; 423/22, 40, 150

[56] References Cited

U.S. PATENT DOCUMENTS

| | | | |
|---|---|---|---|
| 1,277,035 | 8/1918 | Boericke | 75/27 |
| 2,150,366 | 3/1939 | Erhart | 75/112 |
| 2,946,677 | 7/1960 | Shelton | 75/97 |
| 3,767,760 | 10/1973 | Hougen et al. | 423/22 |
| 3,891,427 | 6/1975 | Persson | 75/11 |
| 3,920,790 | 11/1975 | Pittie et al. | 423/22 |

*Primary Examiner*—Herbert T. Carter
*Attorney, Agent, or Firm*—Cushman, Darby & Cushman

[57] ABSTRACT

A process for the dissolution of precious metal values in a concentrate thereof wherein the concentrate is caused to alloy with aluminum and the alloy is then leached in at least two steps, the first of which is to remove base metals and in the second of which the precious metals are dissolved using hydrochloric acid and chlorine gas or nitric acid as an oxidant.

14 Claims, No Drawings

PROCESS FOR THE TREATMENT OF PLATINUM GROUP METALS AND GOLD

CROSS REFERENCE TO RELATED APPLICATIONS

This application is a continuation-in-part of our earlier application Ser. No. 825,151, filed Aug. 16, 1977, which in turn is a continuation of application Ser. No. 652,283 filed Jan. 26, 1976, both now abandoned.

BACKGROUND OF THE INVENTION

This invention relates to a process for the treatment of mixtures of platinum group metals, gold and silver, and is more particularly concerned with the treatment of so-called platinum group metal concentrates such as matte leach residues and the like, and also various intermediate solid products such as leach insolubles etc. which may arise during the processing of such materials.

All commercial refining methods for the platinum group metals are basically hydrometallurgical in nature. Thus the first and key operation in these processes is the dissolution of the valuable components from the source material.

However, the platinum group metals are extremely difficult to dissolve, and extended leaching periods with highly active media such as aqua regia are commonly used. Even under very vigorous leach conditions complete dissolution of the values is not generally achieved, and in particular the secondary platinum metals (rhodium, ruthenium, iridium and osmium) are attacked to only a small extent. In addition the degree to which the metals dissolve is often highly variable from batch to batch and is generally dependent on the nature of the process steps to which the source material has been subjected prior to the platinum metal leaching step.

Because of these effects it is common practice to use a multi-stage process involving both pyrometallurgical and hydrometallurgical steps to effect dissolution of the platinum metals. One commonly used series of operations is as follows:

(1) performing an initial aqua regia leach on a concentrate of platinum group metals, gold and silver;
(2) smelting the residue with litharge and a reductant to form a lead-platinum group metal alloy;
(3) parting of the lead bullion so formed with nitric acid;
(4) leaching the residue from step (3) with aqua regia which dissolves most of the platinum and palladium but little of the secondary platinum group metals;
(5) fusing the residue which is rich in secondary platinum group metals with sodium peroxide; and
(6) leaching of the fusion mixture with water and neutralising with hydrochloric acid to produce a chloride solution of the secondary platinum group metals.

Various recycle streams are also involved in the practical performance of this currently used procedure.

Thus a large number of operations is involved and a major proportion of the platinum metals is locked up in recycle streams. Many of the recycle streams are initially in the form of solutions; in order for the values contained in these streams to be recovered they must first be treated to render the precious metals insoluble. Commonly, reduction to metal using zinc as the reductant is employed, and this operation is time consuming, expensive and not entirely effective.

Furthermore it is commonly found with many precious metal bearing source materials that a large proportion of the base metal content cannot be effectively separated out before the platinum group metal leach by, for example, a milder leach such as sulphuric acid leaching. These base metals therefore contaminate the leach liquors containing the precious metals and render both refining operations and recycle considerably more difficult.

BRIEF DESCRIPTION OF THE INVENTION

It is the object of this invention to overcome the above difficulties in platinum refining by providing:

(1) a process whereby a large proportion of the base metal content of the feed material can be effectively leached from the precious metal content before the leaching of the precious metals themselves, and/or
(2) a process whereby a large proportion of the precious metal content of the feed material can be dissolved in a single leach using chlorine or nitric acid as the oxidant and hydrochloric acid as the dissolving medium and/or
(3) a process whereby liquid recycle streams containing precious metals can be easily processed to recover the precious metal content without an intermediate zinc reduction step, by achieving reduction during base metal removal.

In this specification for the sake of clarity the term "precious metals" will be applied to mixtures of some or all of the platinum group metals and which may in addition contain gold and/or silver. The term "base metals" as used herein includes all metals other than the "precious metals".

DETAILED DESCRIPTION OF THE INVENTION

In accordance with this invention there is provided a process for the treatment of a precious metal concentrate comprising the formation of an alloy of aluminium and precious metals and recovering at least the majority of the precious metals in solution by a suitable leaching procedure.

Further features of the invention provide for the alloy to be subjected initially to a leaching step adapted to remove base metals and for the precious metals to be recovered subsequently by a second leach step carried out under strong oxidizing conditions and for the base metal leach to be performed in two stages, the first of which is carried out by weak acid under reducing conditions and the second of which is carried out under conditions suitable for the dissolution of copper.

The aluminium precious metal alloy preferably has an aluminium to precious metal ratio of between about 10:1 and 1:1.

The formation of the aluminium alloy can be accomplished in a number of ways but it is most efficiently performed according to one of three techniques which are applicable to concentrates of various grades and compositions as follows:

(1) Concentrates having a high precious metal content (above about 50%) and which is essentially metallic in character (e.g. lead bullion residue after parting) may be treated as follows:
   (a) The material may be simply melted together with an equal weight of aluminium at a temperature in excess of 1000° C. under a protective atmosphere to reduce oxidation of the aluminium.
   (b) The material may be mixed with a small proportion (5%–25%) by weight of a suitable base metal oxide or sulphide, preferably ferric oxide or ferrous sulphide and sufficient aluminium powder, preferably a weight equal to the concentrate. This mixture is then ignited by a suitable technique whereupon the base metal oxide and the aluminium react, and the aluminothermic reaction so initiated provides sufficient heat to accomplish the alloying.

(2) Treatment of concentrates having a medium precious metal content (between about 30% and 50%) with a high base metal content but where silica is present in low concentrations (less than 5%) or is preferably absent: This may be treated in similar fashion to the above except that often sufficient base metal oxides or sulphides are already present in the material to render the addition of further ferric oxide or ferrous sulphide unnecessary. Addition of some flux such as calcium oxide (CaO) may be helpful in rendering the aluminium oxide formed in the reaction soluble in the base metal leach. Certain matte leach residues and initial leach residues fall into this class of concentrate.

(3) Material of medium or low precious metal content (precious metal content of less than 30%) with high base metal content and high silica content: The preferred technique here is to form an intermediate alloy of precious metals and iron which is then alloyed further with aluminium to form typically an alloy containing about 30% Fe, 30% Al, 30% precious metals and 10% other base metals such as Ni, Pb, Cu etc. This operation is typically but not necessarily carried out in an arc furnace as follows:

(a) The concentrate is mixed with carbon and lime, pelletised, and roasted at about 800° C. to reduce any precious metal oxides to metal.

(b) The roasted material is smelted together with scrap iron in an arc furnace to produce an alloy of roughly 50% precious metal content and a calcium-iron-silica slag which is low in precious metals.

(c) The slag is poured off and aluminium scrap is added to the iron alloy in sufficient quantity to form an alloy of roughly 30% Al content.

This technique applies especially to concentrates of high silica content and low precious metal content such as certain matte leach residues but of course could be applied in other cases as well.

In all the above cases the alloy so formed is preferably treated as follows:

(1) The aluminium and iron content of the alloy are leached together under highly reducing conditions, using weak acid to do the leaching. Any recycle streams that are acidic and contain precious metal values can be used in this step. Very effective cementation of the precious metal values has been experienced and the exhausted leach liquor will contain very low precious metal values.

(2) The residue from the first leach is then subjected to a more intensive leach at a potential sufficient to dissolve copper. Many known methods are available for doing this and in particular the controlled potential leach system of Falconbridge (Journal of Metals, May 1975 p 6-9 "The recovery of nickel copper and a precious metal concentrate from high grade precious metal mattes" L. R. Hougan, H. Zacharissen) using chlorine gas as the oxidant would be applicable here.

(3) The residue from the second leach is then leached in hydrochloric acid of commercial strength (about 10 Molar) using an oxidant which is preferably chlorine gas. Leaching has been found to be rapid and complete and the leach residue, if present, consists of insolubles such as silica and alumina with low precious metal content, typically less than 5000 ppm total precious metals. As an alternative to chlorine gas as the oxidant, nitric acid may be used thus forming the well known Aqua Regia.

EXAMPLES OF THE INVENTION

Various experiments conducted thus far will now be described in order to demonstrate the operation of the invention.

EXAMPLE 1

Simply to test the effect of the invention on the most soluble of the secondary platinum group metals, namely rhodium, the following experiment was conducted.

Freshly precipitated, finely sub-divided rhodium metal (200.0 g 99.9% purity) was placed in Aqua Regia (40 liters) at a temperature of 90° C. The intent of the experiment was to dissolve the rhodium in the Aqua Regia. The mixture was observed for several days, and after two weeks had passed, only 60% (by weight) dissolution of the rhodium was obtained.

This experiment confirmed the well-known fact that rhodium, illustrative of the secondary platinum group metals, is not satisfactorily soluble in Aqua Regia within a reasonable period of time.

A further experiment was then conducted in which 50 g of the same finely sub-divided rhodium referred to above was alloyed with 100 g of aluminium and 10 g $Fe_2O_3$ by heating at 1000° C. for a period of 15 minutes whereafter the reaction was allowed to proceed to completion. A rhodium/aluminium alloy was produced, cooled, and the aluminium content thereof leached out with hydrochloric acid (2 liters, 6 N) leaving the rhodium in the solid residue that remained. The solid residue was treated with Aqua Regia (500 ml at 90° C.) and in 20 minutes 99.1 weight percent of the rhodium contained in the original alloy was dissolved.

This clearly showed the effect of the invention of rhodium by producing, in a short time, a substantially complete dissolution of the rhodium metal.

EXAMPLE 2

Dissolution tests were conducted on a mixed platinum group metal generated by a platinum refinery in South Africa.

The material was a so-called "deleaded insoluble" and was supplied in the form of a fine powder. This deleaded insoluble was produced at the refinery by the following sequence of operations:

(a) An intermediate refinery product (a leach residue) was combined in the normal course of refining with litharge (which is a source of lead), carbon and fluxes and smelted to produce a slag and a "lead bullion" containing the platinum metals originally present in the leach residue. This procedure was in essence the same as that outlined by Pittie et al in their U.S. Pat. No. 3,920,790. The exact procedure used cannot be disclosed because the refinery requires that this information be kept confidential.

(b) This "lead bullion" was leached with nitric acid to remove most of the lead and other base metals such as copper, iron, etc. The residue from this leach was the "deleaded insoluble" referred to above. The material (ie the "deleaded insoluble") had the following composition:

Pt—5,5%
Pd—3,8%
Au—0,8%
Ru—17,1%
Rh—9,8%
Ir—2,9%
Os—1,9%
Ag—1,4%
Base metals (Cu, Fe, Pb, Ni) approx. 35%.

A number of methods were tested, for their ability to enable the precious metal values, including the secondary platinum group metals, to be dissolved from the "deleaded insoluble".

The tests conducted were as follows and the resultant dissolutions obtained are shown in the Table below:

Test 1

The material or "deleaded insoluble" was leached in Aqua Regia (a mixture of concentrated hydrochloric and nitric acids in the ratio 5:1 by volume) at a temperature of 90° C. for five hours without any intervening treatment.

Test 2

The material or "deleaded insoluble" was initially treated by heating in a hydrogen atmosphere at 900° C. for one hour before leaching. The leaching procedure used subsequently on the pretreated material was the same as that described in Test 1.

Test 3

The material or "deleaded insoluble" was leached in concentrated hydrochloric acid using chlorine gas as the oxidant for five hours at a temperature of 80° C. without any intervening treatment.

Test 4

The material or "deleaded insoluble" was heated in hydrogen as described for Test 2 above before being leached by the procedure described in Test 3.

Test 5

The material or "deleaded insoluble" was mixed with aluminium powder in a 1:1 ratio by weight and the mixture ignited with a fuse and the aluminothermic reaction set up was allowed to proceed to completion. The product was then subjected to two stages of leaching.

(a) a dilute (4 molar) hydrochloric acid leach to remove aluminium and other base metals, and, (b) a second leach using concentrated hydrochloric acid and chlorine gas to effect dissolution of the platinum metals. Conditions of this leach were altered from that described in test 1 only in that the leaching time was reduced to one hour from the five hours used in that test.

Test 6

Exactly the same method was followed as outlined in test 5 except that dissolution of the platinum metals was effected using Aqua Regia and not hydrochloric acid/chlorine. The leach time in this case was two hours as compared with one hour for test 5 and five hours for tests 1 through 4.

All the leach solutions were analysed for platinum group metals and the extent of dissolution of each metal was calculated by comparing the solution assay with the assay of the original material.

In tests 5 and 6 no platinum metals were found to have dissolved in the first leach i.e. the dilute hydrochloric leach (step (a)).

The results obtained are listed in the table:

| Test | Percentage dissolved | | | | | | |
|---|---|---|---|---|---|---|---|
| | Pt | Pd | Au | Ru | Rh | Ir | Os |
| 1. | 89,3 | 76,2 | 92,9 | 2,0 | 8,5 | 2,5 | 2,0 |
| 2. | 96,3 | 97,4 | 98,5 | 4,5 | 14,6 | 8,3 | 5,0 |
| 3. | 86,3 | 74,5 | 90,2 | 2,5 | 7,6 | 2,0 | 2,1 |
| 4. | 97,0 | 98,3 | 98,5 | 6,0 | 16,8 | 7,5 | 6,5 |
| 5. | 99,1 | 99,8 | 99,8 | 97,1 | 98,9 | 97,4 | 98,6 |
| 6. | 99,5 | 99,2 | 99,6 | 98,0 | 98,5 | 98,3 | 97,6 |

The results tabulated above clearly show that the following conclusions can be drawn:

(a) In all comparable tests namely tests 1 and 3, tests 2 and 4, and tests 5 and 6, the dissolutions obtained using hydrochloric acid/chlorine are closely comparable with those using Aqua Regia as the leaching agent.

(b) In all cases of known leaching techniques after lead alloying (i.e. tests 1 to 4) the degree of dissolution of Ruthenium (Ru), Rhodium (Rh), Iridium (Ir) and Osmium (Os) is very poor and not sufficient by any means for a practical dissolution process in a commercial undertaking.

(c) In contradistinction to the unsatisfactory results of test 1 through 4 insofar as the secondary platinum group metals (i.e. Ruthenium, Rhodium, Iridium and Osmium) are concerned, the results of tests 5 and 6 are highly satisfactory with regard to all the platinum group metals. Thus a process based on tests 5 and 6 which involve the formation of an aluminium alloy can be used as a practical commercial dissolution process for the secondary (and primary) platinum group metals. It is also to be noted that the solubility of the primary platinum group metals (namely platinum, palladium and gold) is improved after formation of an aluminium alloy. It is still further to be noted that after aluminium alloying the time required for dissolution is vastly improved whether hydrochloric acid/chlorine or Aqua Regia be used to effect dissolution.

EXAMPLE 3

The concentrate treated here was a moderately rich platinum group metal concentrate obtained from a copper-nickel matte leach plant and which analysed roughly 30% precious metals (platinum group metals +Au+Ag) and approximately 30% base metal, the remainder being oxygen, sulphur and silica. A sample of this material was firstly leached in 12 M hydrochloric acid using chlorine as the oxidant and the following percentage dissolutions were obtained:

| Pt | Pd | Rh | Ru | Ir |
|---|---|---|---|---|
| 80.8% | 70.7% | 32.7% | 14.6% | 64.8% |

These results were improved considerably by performing a reduction roast prior to leaching on another sample of the material, but complete dissolution could still not be obtained, the percentage dissolutions being as follows:

| Pt | Pd | Rh | Ru | Ir |
|---|---|---|---|---|
| 98.4% | 98.3% | 81.9% | 52.4% | 96.9% |

A third sample of the material was then aluminothermically reduced with an equal weight of aluminium powder, by mixing the two ingredients and igniting the mixture by heating to about 1000° C. The reacted material was firstly leached with 12 M hydrochloric acid in order to remove aluminium and base metals, and thereafter with 12 M hydrochloric acid with $Cl_2$ as the oxidizing agent in order to dissolve the platinum group metals. The results obtained upon leaching the reacted mass were as follows:

| Pt | Pd | Rh | Ru | Ir |
|---|---|---|---|---|
| 99.6% | 99.4% | 87.8% | 96.9% | 96.9% |

Thus the residue left after leaching was significantly poorer in platinum group metal content and in practice could be recycled to the matte smelting furnace.

EXAMPLE 4

The concentrate used in this example was similar to that described above but had a lower precious metal content (±20%), and was very much more refractory in nature. Results obtained on the raw material on leaching with 12 M hydrochloric acid with $Cl_2$ were as follows:

| Pt | Pd | Rh | Ru | Ir |
|---|---|---|---|---|
| 63.9% | 53.7% | 30.9% | 16.4% | 45.2% |

In this case, treating the material by means of a reducing roast prior to leaching did not produce as marked an improvement as in Example I, the results being the following percentage dissolutions:

| Pt | Pd | Rh | Ru | Ir |
|---|---|---|---|---|
| 89.2% | 94.2% | 38.1% | 3.4% | 16.5% |

However, after aluminothermic reduction had been carried out in a manner identical to that described in Example I, very good subsequent dissolutions were obtained:

| Pt | Pd | Rh | Ru | Ir |
|---|---|---|---|---|
| 99.3% | 99.4% | 97.6% | 95.6% | 87.3% |

This example also illustrates that base metals can be removed almost completely before $HCl/Cl_2$ leaching by leaching in sulphuric acid, under oxidizing conditions. The following percentage dissolutions were found to be typical:

| Cu | Ni | Fe | Cr | Al |
|---|---|---|---|---|
| 91.2% | 85.5% | 87.7% | 25.5% | 95% |

The amount of platinum group metals dissolved together with the base metals was negligibly small.

EXAMPLE 5

The concentrate treated here was a secondary platinum group concentrate obtained from the parting and aqua regia treatment of lead bullion obtained as above described, and this contained about 60% platinum group metals, 20% lead and 20% other base metals.

Both direct leading with $HCl/Cl_2$ and leaching in the same way following hydrogen reduction of this material proved to be almost completely ineffective, as shown below:

| | Ru | Rh | Ir |
|---|---|---|---|
| no pre-treatment | 0% | 18.5% | 2.2% |
| hydrogen reduction pre-treatment | 5.7% | 14.6% | 6.7% |

A sample of this concentrate was then treated by mixing it with an equal weight of aluminium powder, and 20% by weight FeS. This mixture was ignited by heating at 1000° C. and the reacted mass leached firstly in 200 g/l sulphuric acid to remove the base metals and aluminium and subsequently in 12 M $HCl/Cl_2$. The percentage dissolutions obtained after leaching for two hours were as follows:

| Ru | Rh | Ir |
|---|---|---|
| 89.6% | 92.9% | 95.8% |

This experiment was repeated on a larger scale and it was found that almost all of the base metals added and originally present were leached in the sulphuric acid leach. Subsequent $HCl/Cl_2$ leaching for two hours gave similar dissolution, viz:

| Ru | Rh | Ir |
|---|---|---|
| 90.8% | 93.1% | 90.3% |

A third test on this concentrate was conducted wherein 5 kg of concentrate were treated in a similar fashion to the above. The alloy was subjected to an initial leach in 10 M HCl with the addition of 500 g $Fe_2O_3$ until the precious metals just started to dissolve. Filtration was effected immediately and showed an analysis 45 ppm precious metals, 7 g/l Fe, 3 g/l Pb and 120 ppm Cu. Leaching in 10 M $HCl/Cl_2$ was then effected and was continued for eight hours as opposed to the two hour leach times above. The extension of the leach time increased the percentage dissolved substantially to that given below:

| Ru | Rh | Ir |
|---|---|---|
| 99.1% | 99.5% | 99.3% |

This leach liquor contained 54 g/l precious metals, 150 ppm Cu and 1,6 g/l of other base metals thus illustrating that the majority of base metals had been removed.

The above leach procedure was carried out in a two step manner as opposed to the preferred three step procedure set out above. The results of the three step procedure are, at this time, not available but the following are the reasons for preferring a separate copper leach. In the leaching of iron, aluminium and similar base metals strongly reducing conditions are present when the alloy is leached with HCl or $H_2SO_4$ solution. Thus in that leach step there is virtually no possibility of dissolving precious metals. In the second step in which copper would be leached more oxidizing conditions exist thereby increasing the chance of precious metals being dissolved. Also, a substantially smaller vessel is required to effect the subsequent copper leach thereby resulting in smaller volumes of leach liquor to be treated for dissolved precious metals. The conditions in each stage of a two stage initial leach can be optimised and a plant can more readily be efficiently designed.

EXAMPLE 6

This example illustrates an alternative method of performing the invention. A concentrate similar to that used in Example 5 was mixed with an equal weight of aluminium powder, and the mixture melted in a muffle furnace at 1000° C. for two hours. The molten mass was allowed to cool and then leached with 200 g/l $H_2SO_4$ to remove the aluminium and base metals and the residue was dissolved in 12 M $HCl/Cl_2$. The percentage dissolutions obtained in this case were as follows:

| Ru | Rh | Ir |
|---|---|---|
| 95.6% | 91.5% | 96.3% |

EXAMPLE 7

A concentrate containing about 20% precious metals, 16% silica and 14% iron oxides was heated at 800° C. with carbon for one hour. The amount of carbon added is dependent on the iron and platinum group metals that are present as oxides. The period of roasting is dependent on the kinetics of the reduction process and this will vary with temperature, composition, particle size and the mineralogy of the material.

The reduced material was split into two batches, each of which was treated as follows.

The reduced material together with lime (CaO) in an amount of about 1 part was melted at 1600° C.; iron scrap was added and the melt cooled. The metal was separated from the slag and alloyed with aluminium in the ratio of O,4:1 Al: precious metal alloy at 1600° C. by first melting the metal and adding solid aluminium to the metal. After cooling the aluminium alloy was leached in concentrated (10 M) HCl acid and the residue leached in concentrated (10 M) HCl and $Cl_2$. After this leach there was no residue remaining. The recovery of the various platinum group metals in the final leach liquors is given in the following table:

TABLE

|  | Pt | Pd | Rh | Ru | Os | Ir | Au |
|---|---|---|---|---|---|---|---|
| Precious metals in head sample mass % | 1,11 (″) | 6,40 (″) | 2,99 (″) | 6,51 (″) | 1,43 (″) | 0,44 (″) | 670ppm (″) |
| Precious metals in slag (ppm) | ← | ← | 2434 (920) | → | → | → | → |
| Precious metals in HCl leach liquor (ppm) | ← | ← | 1,4 (4,3) | → | → | → | → |
| Precious metals in $HCl/Cl_2$ leach liquor (ppm) | 700 (743) | 5063 (5583) | 2019 (2019) | 4438 (4775) | 850 (835) | 315 (330) | 1600 (1714) |
| Precious metals recovered in slag % | ← | ← | 3% (1,4%) | → | → | → | → |
| Precious metals recovered in alloy % by difference | ← | ← | 97% (98,6%) | → | → | → | → |
| Precious metals recovered in alloy (calculated from $HCl/Cl_2$ leach solution values) | ← | ← | 109,3% (108,1%) | → | → | → | → |

The discrepancies in the recovery of precious metals which are quite obvious were due to assay errors. The figures given in parentheses are for the second half of the initial reduced material.

EXAMPLE 8

Finally the operation of the use of a precious metal containing simulated recycle stream was tested in order to observe the cementation effects with the aluminium alloy.

40 liters of an imitation recycle stream of approximately 2 M HCl and containing

| Ru | Rh | Pd | Pt | Ir |
|---|---|---|---|---|
| 6000 ppm | 5031 ppm | 735 ppm | 3 ppm | 1250 ppm | were contacted with 1 Kg of crushed aluminium-precious metal alloy. The alloy had a particle size of 100% minus ¼ inch mesh and the contacting was effected at 60° C. for six hours.

The solution was filtered off and found to contain:

| Ru | Rh | Pd | Pt | Ir |
|---|---|---|---|---|
| 1,5 ppm | N.D. | 0,4 ppm | N.D. | 6 ppm |

(N.D. means not detectable)

Thus cementation apparently occurred with a high degree of efficiency.

The above tests which have been carried out demonstrate that a process according to the invention will operate effectively in use. It will be noted that where hydrochloric acid has been used the strength was either 10 M or 12 M. As will be apparent to those skilled in the art any strength acid may be used with the more dilute acids simply taking longer to produce the desired effect. Also, any strength sulphuric acid could be used up to a maximum strength of about 500 g/l.

The invention therefore provides a process having the following characteristics:

(1) It allows the base metal content to be removed prior to the platinum group metal leach by leaching with dilute sulphuric acid or hydrochloric acid, and (2) It increases the leachability of the platinum group metals in an oxidizing hydrochloric acid leach to a very great extent, so that in effect total dissolution can be achieved.

The process may be applied to any platinum group metal rich material arising at any stage of the conventional refining process, and in particular can be readily applied to the following materials:

(1) feed material to the refinery, thus eliminating the need for subsequent treatment of the residue. In practice, because platinum group metals are so valuable, this residue, if present at all, although low in platinum group metals content, would be recycled to a point earlier in the process such as the matte smelter, (2) the residue from the primary leach, and (3) the residue from the parting and aqua regia leaching of the lead bullion in which use of the method is a replacement for the potentially harzardous sodium perioxide fusion.

What we claim as new and desire to secure by Letters Patent is:

1. A process for obtaining, by the action of an acid and an oxidizing agent, a solution of precious metals present in a precious metal concentrate which contains iridium, ruthenium or both together with base metals, said process comprising the steps of:
   (1) heating the precious metal concentrate together with aluminium at a temperature of at least about 1000° C., and for a length of time sufficient to form a precious metal/aluminium alloy,
   (2) leaching the alloy with acid under conditions other than strongly oxidizing conditions to dissolve the base metals yielding a residue containing the major portion of the precious metals therein,
   (3) separating the residue from the leach liquor, and thereafter,
   (4) leaching the residue under strong oxidizing conditions with acid and an oxidant to dissolve at least a major portion of the iridium and ruthenium together with any other precious metals present in said residue.

2. A process as claimed in claim 1 in which the precious metal/aluminium alloy contains copper therein and is initially leached with acid under strong reducing conditions to remove the majority of base metals and yield a first residue, the first residue is then leached with acid to selectively dissolve copper providing a second residue, and the second residue is thereafter leached under strong oxidizing conditions to dissolve the precious metals contained therein.

3. A process as claimed in claim 1 in which the leach for the removal of the majority of the base metals in step (2) is hydrochloric or sulphuric acid.

4. A process as claimed in claim 3 in which the acid is contained in a recycle stream together with small amounts of precious metals which are cemented out during the leaching procedure of step (2).

5. A process as claimed in claim 1 in which dissolution of the precious metals in step (4) wherein concentrated hydrochloric acid and chlorine gas is used as an oxidant.

6. A process as claimed in claim 1 in which the precious metal concentrate contains more than 30% by weight precious metals and less than about 5% silica, and the formation of the precious metal/aluminium alloy of step (1) is effected by mixing the concentrate with sub-divided aluminium to provide a precious metal/aluminium mixture and then heating the mixture to form a molten alloy.

7. A process as claimed in claim 6 in which the heating is conducted in a protective atmosphere to reduce oxidation of the aluminium.

8. A process as claimed in claim 6 in which the concentrate contains an amount of base metal oxides or sulphides to enable the mixture when heated to undergo a highly exothermic aluminothermic reaction.

9. A process as claimed in claim 6 in which a base metal oxide, sulphides or both are added to the mixture to enable the mixture when heated to undergo a highly exothermic aluminothermic reaction.

10. A process as claimed in claim 1 in which the precious metal concentrate contains less than about 30% by weight precious metals and iron, the precious metal/aluminium alloy formed in step (1) by initially forming an iron-precious metal alloy, removing silica in the slag thus formed and adding the required aluminium to such iron alloy.

11. A process as claimed in claim 1 in which the aluminium alloy has an aluminium to precious metal weight ratio of from 10:1 to 1:1.

12. A process for the treatment and recovery of a precious metal concentrate and a base metal or metals, said concentrate containing precious metals selected from the group consisting of platinum group metals, gold silver and mixtures thereof wherein the base metals are first removed and the precious metals present in the concentrate are substantially completely recovered, said process including the successive steps of:
   (a) heating a precious metal concentrate containing iridium, ruthenium or both with aluminium at a temperature of at least about 1000° C. and for a length of time sufficient to form an aluminium/precious metal alloy, the ratio of aluminium to precious metal in said alloy in a weight ratio of about 10:1 to 1:1;
   (b) selectively leaching the aluminium/precious metal alloy of step (a) with hydrochloric or sulphuric acid to dissolve the base metal and aluminium from the alloy while a major portion of the precious metals remain in the residue yielding a precious metal-rich residue and a leach liquor;
   (c) separating the leach liquor from the residue of step (b);
   (d) subjecting the separated residue to hydrochloric acid and chlorine gas as an oxidant thereby dissolving the precious metals contained in said residue.

13. A process for the treatment and recovery of a precious metal concentrate and a base metal or metals, said concentrate containing precious metals selected from the group consisting of platinum group metals, gold, silver and mixtures thereof wherein the base metals are first removed and the precious metals present in the concentrate are substantially completely recovered, said process including the successive steps of:
   (a) heating a precious metal concentrate containing iridium, ruthenium or both with aluminium at a temperature of at least about 1000° C. and for a length of time sufficient to form an aluminium/precious metal alloy, the ratio of aluminium to precious metal in said alloy in a weight ratio of about 10:1 to 1:1;

(b) selectively leaching the aluminium/precious metal alloy of step (a) with hydrochloric or sulphuric acid to dissolve the base metal and aluminium from the alloy while a major portion of the precious metals remain in the residue yielding a precious metal-rich residue and a leach liquor;

(c) separating the leach liquor from the residue of step (b); and (d) subjecting the separated residue to hydrochloric acid and chlorine gas as an oxidant thereby dissolving the precious metals contained in said residue.

14. A process for the treatment and recovery of a precious metal concentrate and a base metal or metals, said concentrate containing precious metals selected from the group consisting of platinum group metals, gold, silver and mixtures thereof, wherein the base metals are first removed and the precious metals present in the concentrate are substantially completely recovered; said process including the successive steps of;

(a) heating a precious metal concentrate containing iridium, ruthenium or both with aluminium at a temperature of at least about 1000° C. and for a length of time sufficient to form an aluminium/precious metal alloy also containing copper therein, the ratio of aluminium to precious metal in said alloy in a weight ratio of about 10:1 to 1:1;

(b) selectively leaching the aluminium/precious metal alloy of step (a) under reducing conditions to dissolve and remove a major portion of the base metals in the leach liquor leaving a concentration of the precious metal values as a residue;

(c) separating the leach liquor from the residue of step (b):

(d) selectively dissolving copper contained in the residue of step (c) with acid forming a copper-containing leach liquor and a residue;

(e) separating the leach liquor from the residue of step (d);

(f) leaching the residue of step (e) with acid under strong oxidizing conditions to dissolve the precious metals contained therein.

* * * * *